United States Patent
Mittal et al.

(10) Patent No.: US 8,751,650 B2
(45) Date of Patent: Jun. 10, 2014

(54) METHOD AND APPARATUS FOR SUPPORTING ACCESS CONTROL LISTS IN A MULTI-TENANT ENVIRONMENT

(75) Inventors: Anuraag Mittal, San Jose, CA (US); Maithili Narasimha, Sunnyvale, CA (US); Ashwin Deepak Swaminathan, San Jose, CA (US); Badhri Madabusi Vijayaraghavan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 13/468,739

(22) Filed: May 10, 2012

(65) Prior Publication Data
US 2013/0304917 A1 Nov. 14, 2013

(51) Int. Cl.
*G06F 15/16* (2006.01)
*G06F 12/00* (2006.01)

(52) U.S. Cl.
USPC ........................................ 709/225; 709/250

(58) Field of Classification Search
CPC ... H04L 63/101; H04L 45/00; H04L 63/0263; H04L 63/102; H04L 45/60; H04L 63/0227; H04L 47/2441; H04L 63/0272; H04L 63/105; H04L 63/20; H04L 45/745; H04L 45/7453; H04L 45/7457; H04L 47/10
USPC ........................... 709/223–229, 203, 245, 250
See application file for complete search history.

(56) References Cited

U.S. PATENT DOCUMENTS

| | | | |
|---|---|---|---|
| 6,377,577 B1 | 4/2002 | Bechtolsheim et al. | |
| 6,651,096 B1 | 11/2003 | Gai et al. | |
| 6,700,891 B1 | 3/2004 | Wong | |
| 7,188,164 B1 | 3/2007 | Etheridge | |
| 7,336,660 B2* | 2/2008 | Pullela | 370/392 |
| 7,389,354 B1 | 6/2008 | Sitaraman et al. | |
| 2004/0165613 A1* | 8/2004 | Kim et al. | 370/463 |
| 2005/0086491 A1* | 4/2005 | Haugh et al. | 713/182 |
| 2008/0163207 A1 | 7/2008 | Reumann et al. | |
| 2009/0094680 A1* | 4/2009 | Gupta et al. | 726/3 |
| 2010/0281060 A1* | 11/2010 | Ahmed et al. | 707/785 |
| 2011/0185395 A1* | 7/2011 | Otsuka | 726/1 |
| 2011/0283348 A1 | 11/2011 | Ling et al. | |

FOREIGN PATENT DOCUMENTS

WO WO 03/103239 12/2003

* cited by examiner

*Primary Examiner* — Zarni Maung
(74) *Attorney, Agent, or Firm* — Cindy Kaplan

(57) ABSTRACT

In one embodiment, a method includes identifying common access control list (ACL) parameters and variable ACL parameters among a plurality of tenants in a network, mapping parameter values for the variable ACL parameters to the tenants, generating a multi-tenant access control list for the tenants, storing the multi-tenant access control list and mapping at a network device, and applying the multi-tenant access control list to ports at the network device. The multi-tenant access control list includes the common ACL parameters and variable ACL parameters.

20 Claims, 4 Drawing Sheets

METHOD AND APPARATUS FOR SUPPORTING ACCESS CONTROL LISTS IN A MULTI-TENANT ENVIRONMENT

TECHNICAL FIELD

The present disclosure relates generally to communication networks, and more particularly, to supporting access control lists in a multi-tenant environment.

BACKGROUND

Many enterprise and service provider customers are building private or public clouds. Cloud computing enables network access to a shared pool of configurable resources that can be rapidly provisioned and released with minimum management effort. In a multi-tenant model, a provider's resources are pooled to serve multiple customers, with different physical and virtual resources dynamically assigned and reassigned according to customer demand. In cloud computing, a multi-tenant environment allows multiple customers to use the same public cloud. In a data center supporting multiple tenants, custom access control lists (ACLs) are needed for different tenants, networks, or virtual machines. Due to constraints on memory and processing, it is difficult for a network device to support a large number of unique ACLs.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
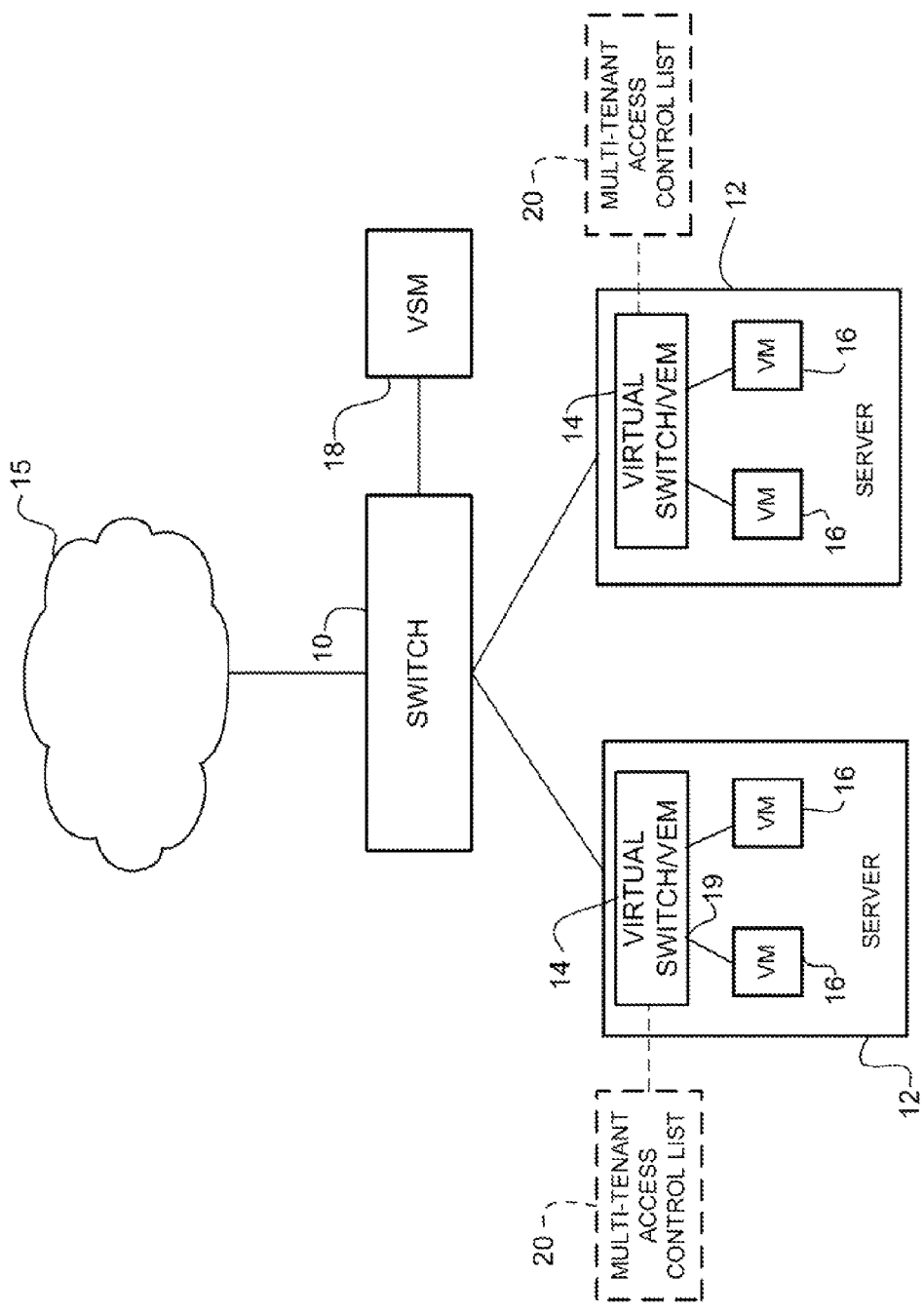
FIG. 1 illustrates an example of a network in which embodiments described herein may be implemented.

In one embodiment, a method generally comprises identifying common access control list (ACL) parameters and variable ACL parameters among a plurality of tenants in a network, mapping parameter values for the variable ACL parameters to the tenants, generating a multi-tenant access control list for the tenants, storing the multi-tenant access control list and mapping at a network device, and applying the multi-tenant access control list to ports at the network device. The multi-tenant access control list comprises the common ACL parameters and variable ACL parameters.

In another embodiment, an apparatus generally comprises a processor for identifying common access control list (ACL) parameters and variable ACL parameters among a plurality of tenants in a network, mapping parameter values for the variable ACL parameters to the tenants, and generating a multi-tenant access control list for the tenants. The apparatus further comprises memory for storing the multi-tenant access control list and mapping. The multi-tenant access control list comprises the common ACL parameters and variable ACL parameters and is configured for use at a virtual switch.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Cloud computing provides resources and services that are abstracted from an underlying infrastructure and provided on demand and at scale. Intrinsic to cloud computing is the presence of multiple tenants with numerous applications using the on-demand cloud infrastructure. Support for multi-tenancy has become an important requirement for data centers, especially in the context of data centers supporting virtualized servers, referred to as virtual machines (VMs). Multiple virtual machines share hardware resources without interfering with each other so that several operating systems and applications can be run at the same time on a single computer.

In data centers supporting multiple tenants, there is a need for custom access control lists (ACLs) on a per-tenant basis. For example, service providers hosting a number of tenants need to configure ACLs customized per tenant, per tenant network, or per virtual machine. Additional memory is needed at the network device to support the large number of ACLs and additional processing is needed to optimize the ACLs for data path decision performance and to distribute the ACLs. Also, the configuration complexity increases due to the large number of ACLs. Based on memory and processing constraints, there is a limit to the number of unique access control lists that can be adequately supported in conventional systems.

The embodiments described herein provide support for multi-tenant ACLs that can be configured on a network device with minimal changes to the syntax and semantics of the ACLs and minimal complexity for configuration. As described in detail below, the embodiments make use of the fact that except for a few rules that differ between customers (tenants), the rest of the rule set remains the same among different customers. Thus, rather than compiling a separate decision tree comprising all rules for each of the customers, a common decision tree that covers a common rule set is used for a group of customers and distinct trees or lookup mechanisms are used to capture the unique rules that differ among the customers.

The embodiments simplify ACL configuration through the use of variables in the ACL that correspond to tenant specific attributes defined in the configuration. The embodiments scale better than conventional systems by providing reduced memory requirements and processing requirements for optimizing ACLs and distributing ACLS, due to the lower number of ACLs.

Referring now to the drawings, and first to FIG. 1, an example of a network in which embodiments described herein may be implemented is shown. For simplification, only a small number of network elements are depicted. The network may be configured for use as a data center or any other type of network. As shown in FIG. 1, a physical switch 10 is in communication with network devices (e.g., server, host) 12 and a network 15. The switch 10 may be, for example, an access switch in communication with an aggregation switch or edge switch (not shown). There may be any number of physical switches 10 located between the servers 12 and network 15. For example, there may be multiple switches 10 to provide redundancy for traffic flow between the servers 12 and network 15. The network 15 may include one or more networks (e.g., local area network, metropolitan area network, wide area network, virtual private network, enterprise network, Internet, intranet, radio access network, public switched network, or any other network). The network 15 may include any number or type of network devices (e.g., routers, switches, gateways, or other network devices), which facilitate passage of data over the network.

Each server 12 includes a virtual switch (referred to herein as a Virtual Ethernet Module (VEM)) 14 and one or more virtual machines (VMs) 16. The virtual machines 16 share hardware resources without interfering with each other, thus enabling multiple operating systems and applications to execute at the same time on a single computer. A virtual machine monitor such as hypervisor (not shown) dynamically allocates hardware resources to the virtual machines 16. Each server 12 may include any number of virtual machines 16 and the virtual machines may be moved (referred to as vmotion, live migration, or virtual machine migration) between servers and across layer 2 or layer 3 boundaries, based on traffic patterns, hardware resources, or other criteria. The server 12 may be, for example, a blade server, rack server, or any other type of network device operable to host virtual machines 16. The servers 12 may, for example, host application servers or remotely hosted virtual machine applications for use at end user equipment (end stations, client devices) (not shown).

The virtual machines 16 are in communication with the virtual switch 14 via virtual network interface cards (VNICs) which connect to a virtual Ethernet interface (port, virtual port) 19 at the virtual switch. The server 12 includes an Ethernet port for each physical network interface card. The Ethernet ports may be aggregated at a port channel. The virtual switches 14 are in communication with the network 15 via the physical Ethernet interfaces. The virtual switch 14 switches traffic between the virtual machines 16 and the physical network interface cards.

The physical switch 10 is also in communication with a Virtual Supervisor Module (VSM) 18. The VSM 18 may be located in a physical appliance in communication with the servers 12 via physical switch 10 or the VSM may be a virtual appliance (e.g., virtual machine) installed at one of the servers 12 or another server in the network. The VSM 18 is configured to provide control plane functionality for the virtual machines 16. The virtual switch 14 provides switching capability at the server 12 and operates as a data plane associated with the control plane of the VSM 18. The VSM 18 and virtual switch (VEM) 14 operate together to form a distributed virtual switch (DVS) as viewed by a management station (not shown). The distributed virtual switch may be, for example, a Nexus 1000V series switch available from Cisco Systems, Inc. of San Jose, Calif.

It is to be understood that the distributed virtual switch shown in FIG. 1 and described above is only an example, and the embodiments described herein may be implemented in other virtual switches. The term 'virtual switch' as used herein may refer to a distributed virtual switch (e.g., VEMs 14 and VSM 18) or other virtual switch operable to switch traffic between a network device (e.g., physical switch, router, gateway) and virtual machines at a server or other network device in a virtualized server environment.

Access to data within the data center may be controlled through the use of access control lists 20 stored at the virtual switch (e.g. VEM 14). The ACL 20 may be defined by a set of data associated with a file, directory, policy, or other network resource that defines the permission that users, groups, processes, or devices have for accessing it. For example, the ACL 20 can be used to secure data access and identify which requestors are authorized to utilize the data or other resources (e.g., virtual machines 16). The ACL 20 may be based upon a rule or policy, which may be defined, for example, by a network administrator. In one embodiment, the ACL 20 is specified in a port profile. A port profile is a container used to define a common set of configuration policies (attributes) for multiple interfaces. The port profiles are associated with port configuration policies defined by the network administrator and applied automatically to a large number of ports as they come online in a virtual environment. The port profiles allow a single policy or identifier to be applied across a large number of ports and support static and dynamic mapping to ports.

Each ACL 20, when defined and associated with an interface, is compiled into a decision tree and stored at the virtual switch 14 for enforcement. The ACL 20 may be generated (created, compiled) at the VSM 18 and distributed to the VEMs 14 or generated at each VEM 14. The information used to generate the ACL 20 may be transmitted to each VEM 14 and the ACL generated only on the VEMs for which the ACL is needed. For example, if the VEM 14 is not in communication with any of the VMs, networks, or tenants for which the ACL 20 applies, there is no need for the ACL to be compiled at that VEM 14.

As described below, the access control list 20 is a multi-tenant access control list that is used to combine unique ACLs for different tenants to create a single ACL comprising common policies across tenants and variable defined policies that differ among tenants. The variable defined policies are associated with a table or programmed entry that maps variable parameters to values for each of the tenants. This significantly reduces the number of ACLs that need to be supported at the network device, thereby reducing memory and processing requirements. As described further below, the multi-tenant ACL 20 allows service providers to provide a value-added service to tenants. Service providers can offer their customers an option to create instances of ACLs for tenant networks or virtual machines that are specific to the tenant. For example, a tenant can select and pay for ACLs to permit only traffic from enterprise IP range to VMs in cloud or permit VMs to talk to other VMs for the same tenant. The service provider can configure ACLs that are tenant specific and with ACL logging enabled, provide additional visibility.

It is to be understood that the network shown in FIG. 1 and described herein is only an example and that the embodiments may be implemented in networks having different network topologies or network devices, without departing from the scope of the embodiments.

As noted above, the example illustrated in FIG. 1 includes a small number of network elements. An infrastructure for a cloud computing environment can have a large number of tenants. Within the cloud environment, each of the tenants needs to be logically isolated from one another, even at the network level. Isolation techniques include, for example, the use of Virtual Local Area Networks (VLANs). In order to provide segmentation at cloud-deployment scale, Virtual eXtensible Local Area Network (VXLAN) may be used to provide network virtualization overlays. Traffic within a network may be separated among multiple customers based on a constant such as segment identifier (in the case of VXLAN) or VLAN identifier. For example, the same VXLAN may be configured on one or more distributed virtual switches to create network virtualization overlays. Thus, there may be a plurality of servers 12 supporting a plurality of virtual machines 16 comprising one or more interfaces each associated with a virtual local area network or a virtual local area network segment at different network locations. Clients or business units (e.g., research and development, corporate, finance) may be assigned different VLANs or VXLAN segments, which are used at various locations in communication with a data center.

In one example, tenant virtual machines 16 are on the same isolated private VLAN and each tenant virtual machine is provided a public IP (Internet Protocol) address. The service provider needs an ACL for each virtual machine 16 to prevent one tenant from spoofing another tenant's IP address. The service provider does not want to allocate a different subnet or separate VLAN for each virtual machine 16, as these are public IP addresses, which are limited resources.

In another example, the ACL configuration on a service provider switch may include two or more tenant ACLs that are identical except for the IP range. In this example, the service provider needs an ACL for each tenant, with the only difference being one field (IP address).

In order to reduce configuration clutter and simply ACL definitions, a variable parameter is used in a rule declaration and a separate mapping of the parameter value is maintained for each tenant (e.g., tenant (customer, client, division, business unit, etc.), tenant network (VLAN) or network segment (VXLAN), tenant virtual machine 16).

Figure 2:
FIG. 2 shows an access control list variable table, in accordance with one embodiment.

FIG. 2 illustrates an example of a table 22 containing a mapping of the values for the variable parameters to the tenants, in accordance with one embodiment. In this example, tenants include Client A and Client B and each client is associated with a VLAN/VXLAN. The tenant to VLAN/VXLAN mapping is typically maintained on the system, thus the table 22 may also be configured to include only the client or VLAN/VXLAN. In this example, the ACL is applied to a port profile, thus the table 22 includes a port profile for each client. Instead of the port profile, the table may include the ports (physical or virtual ports) to which the ACL is applied.

The table 22 further includes one or more variable parameters that are included within the ACL to identify those parameters that differ among tenants. In the example shown in FIG. 2, the variable parameter is an IP address range and the table includes two variable parameters; $ip_range_1 and $ip_range_2. It is to be understood that this is only an example and the number and type of variable parameters may be different than shown, as described below. Also, the table 22 shown in FIG. 2 is only an example of a data structure that may be used to map parameter values to tenants. Another data structure comprising different data (e.g., different or fewer columns, different parameters, additional rows) may be used without departing from the scope of the embodiments.

Based on the table shown in FIG. 2, the unique tenant access control lists can be combined, with the ACLs that are typically defined separately for each tenant redefined into a single ACL as follows:

ip access-list ess-tier10-from-public
  10 permit ip $ip_range_1 $ip_range_2
  20 permit tcp any any eq www
  30 permit tcp any any eq 443
  40 permit tcp any any eq 22
  50 permit tcp any any eq 3389
  60 permit tcp any any ack syn
  70 deny tcp any any syn
  80 permit tcp any any
  90 permit imp any any echo-reply The above policy can be applied to port profiles or to any ports with the listed VLAN/VXLAN ranges. For example, the above ACL can be applied to ClientA_Profile, ClientB_Profile, or ports on VXLAN with segment ID 4097-5004. The ACL is thus defined with variable parameters ($ip_range_1, $ip_range_2) for which parameter values are provided in a data structure, such as shown in FIG. 2 to provide a mapping between the parameter values and the tenants (tenants, tenant networks, tenant virtual machines). The common parameters (lines 20-90 in above ACL) are combined for all tenants to which the ACL is applied.

The variables may represent user defined or system learned values. For example, variables may represent: enterprise IP range for tenant, management network for service provider, tenant IP range, port security based MAC (Media Access Control) addresses, MAC addresses locked to a port by hypervisor assignment, DHCP (Dynamic Host Configuration Protocol) learned IP address for a virtual machine, or other virtual machine attributes (e.g., name, operating system type) that can be learned by the virtual switch.

User defined variables may include values populated in a service provider provisioning environment. For example, a provisioning tool may be used to populate the table 22. The service provider may create a set of template ACLs and the provisioning tool used to configure table 22 based on customer input and additional tool validations. The ACLs are then applied to the virtual machines 16 instantiated by the customer. The provisioning tool may provide, for example, ACLs that allow traffic only from a range of IP addresses (e.g., in the tenant enterprise range) to access the virtual machines 16, or allow IP addresses assigned to the tenant in cloud access virtual machines and prevent all other IP addresses from accessing the virtual machines.

In one embodiment, the ACL 20 is split into multiple sub-blocks. The split is done to ensure that rules containing variables and other rules that contain only common parameters do not mix. This keeps the common rule set in one block and separates out what is unique for each tenant. In the above ACL example, "permit ip $ip_range_1 $ip_range_2" would be located in one sub-block and the other rules (lines 20-90) would be located in another sub-block.

Each sub-block is evaluated separately in a software data path stage. The sub-blocks without variable parameter rules may be evaluated in an optimized manner. For example, a packet classification algorithm such as HyperCuts may be used. The variable based rules may be evaluated by performing a lookup in the table 22 to obtain values for the variables corresponding to their port profile, VLAN/VXLAN, or other association. Alternatively, the values for a particular port may be programmed into a port entry to improve performance by avoiding the lookup process. A packet classification algorithm such as Efficuts may be used, for example, in the data path stage.

As noted above, the virtual machines 16 may be moved between servers 12 or new tenant virtual machines 16 or IP addresses may be added. In this case, another rule would be added to the table 22 and there would be no need to add a new ACL, as would be required in conventional systems.

Figure 3:
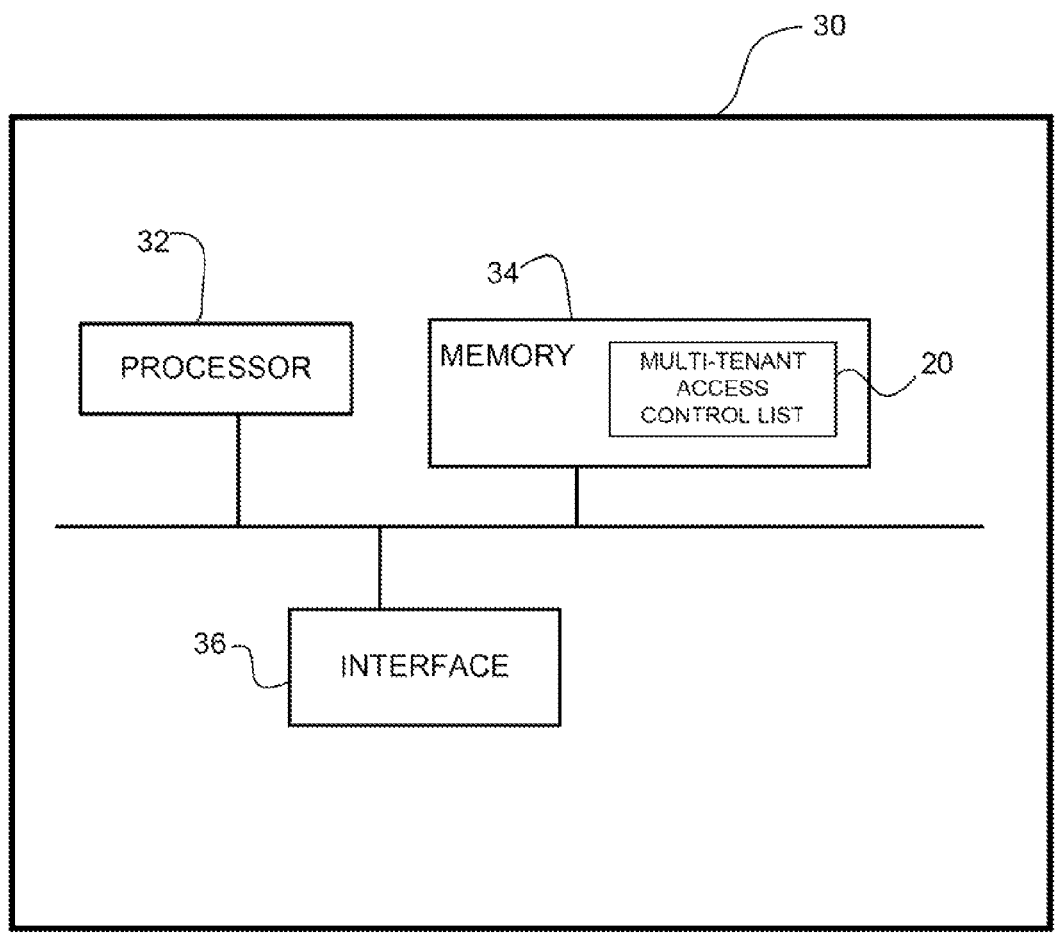
FIG. 3 depicts an example of a network device useful in implementing embodiments described herein.

FIG. 3 illustrates an example of a network device 30 (e.g., server) that may be used to implement the embodiments described herein. In one embodiment, the network device 30 is a programmable machine that may be implemented in hardware, software, or any combination thereof. The network device 30 includes one or more processor 32, memory 34, and network interface 36.

Memory 34 may be a volatile memory or non-volatile storage, which stores various applications, operating systems, modules, and data for execution and use by the processor 32. For example, memory 34 stores the multi-tenant access control list 20 and mapping (table 22).

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 36 may comprise any number of interfaces (e.g., line cards, network interface cards, ports) for receiving data or transmitting data to other devices.

It is to be understood that the network device 30 shown in FIG. 3 and described above is only an example and that different configurations of network devices may be used. For example, the network device 30 may further include any suitable combination of hardware, software, algorithms, processors, devices, components, or elements operable to facilitate the capabilities described herein.

Figure 4:
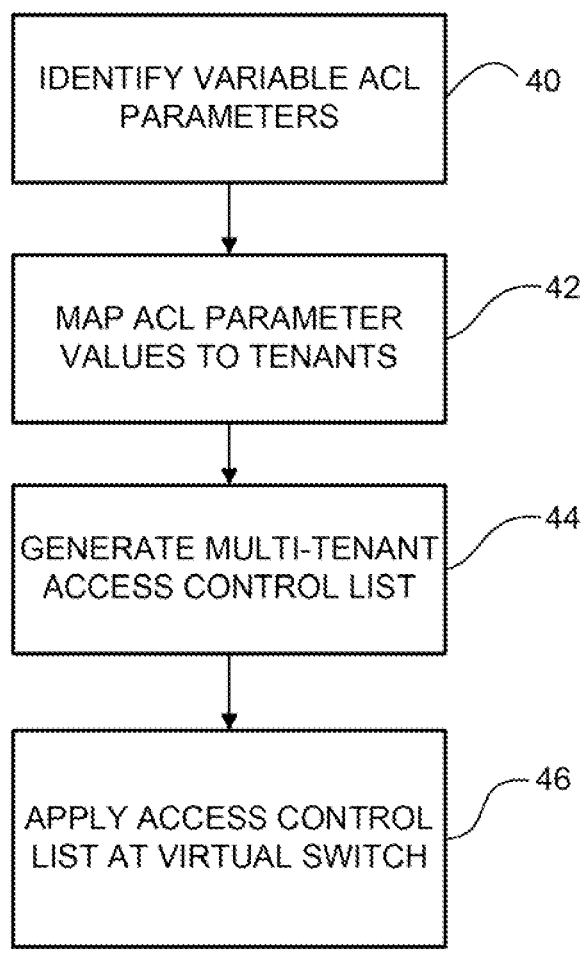
FIG. 4 is a flowchart illustrating an overview of a process for configuring access control lists for a multi-tenant environment, in accordance with one embodiment.

FIG. 4 is a flowchart illustrating a process for configuring multi-tenant access control lists, in accordance with one embodiment. At step 40, variable ACL parameters corresponding to parameters that vary across tenants are identified. There may be one or more variable parameters. The common ACL parameters are also identified. The ACL parameter values are mapped to the corresponding tenants (step 42). For example, the values may be mapped in a table 22 such as shown in FIG. 2. The multi-tenant access control list 20 is generated using the variables included in the table (step 44). For example, the ACL 20 may be compiled into a common decision tree for use in evaluating the common rule set and a separate decision tree or lookup mechanism for use in evaluating unique rules among tenants. As described above, the ACL 20 may be compiled at the VEM 14 or VSM 18 in the distributed virtual switch example shown in FIG. 1. The multi-tenant ACL 20 is applied to one or more ports at the virtual switch 14 to control access to data or resources in the network (step 46). As described above, the ACL 20 can be applied to tenant port profiles or ports (e.g., virtual ports at virtual switch) with the VLAN/VXLAN ranges associated with the tenants.

It is to be understood that the process shown in FIG. 4 and described above is only an example and that steps may be added or modified without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    identifying common access control list (ACL) parameters and variable ACL parameters among a plurality of tenants in a network;
    mapping parameter values for said variable ACL parameters to said tenants;
    generating a multi-tenant access control list for said plurality of tenants, the multi-tenant access control list comprising said common ACL parameters and said variable ACL parameters;
    storing the multi-tenant access control list and said mapping at a network device; and
    applying the multi-tenant access control list to ports at the network device.

2. The method of claim 1 wherein the network device comprises a virtual switch in communication with virtual machines and the ports comprise virtual ports.

3. The method of claim 1 wherein each of said plurality of tenants is associated with one or more virtual networks or virtual network segments.

4. The method of claim 1 further comprising performing a lookup in a table comprising said mapping.

5. The method of claim 1 further comprising programming said mapping into a port entry.

6. The method of claim 1 wherein said parameter values comprise Internet Protocol (IP) address ranges.

7. The method of claim 1 wherein said parameter values comprise virtual machine attributes.

8. The method of claim 7 wherein the virtual machine attributes comprise addresses for the virtual machines.

9. The method of claim 1 wherein the ports comprise port profiles defined within a virtual switch.

10. The method of claim 1 wherein said parameter values comprise values learned on the network.

11. The method of claim 1 wherein said parameter values comprise user defined values.

12. The method of claim 1 wherein mapping parameter values to said tenants comprises mapping said parameter values to networks or virtual machines associated with said tenants.

13. An apparatus comprising:
    a processor for identifying common access control list (ACL) parameters and variable ACL parameters among a plurality of tenants in a network, mapping parameter values for said variable ACL parameters to said tenants, and generating a multi-tenant access control list for said plurality of tenants, the multi-tenant access control list comprising said common ACL parameters and said variable ACL parameters; and
    memory for storing the multi-tenant access control list and said mapping;
    wherein the multi-tenant access control list is configured for use at a virtual switch.

14. The apparatus of claim 13 wherein each of said plurality of tenants is associated with one or more virtual networks or virtual network segments.

15. The apparatus of claim 13 wherein the processor is further configured to perform a lookup in a table comprising said mapping.

16. The apparatus of claim 13 wherein said mapping is programmed into a port entry.

17. The apparatus of claim 13 wherein said parameter values comprise Internet Protocol (IP) address ranges.

18. The apparatus of claim 13 wherein said parameter values comprise virtual machine attributes.

19. The apparatus of claim 13 wherein mapping parameter values to said tenants comprises mapping said parameter values to networks or virtual machines associated with said tenants.

20. Logic encoded on one or more non-transitory computer readable media for execution and when executed operable to:
    identify common access control list (ACL) parameters and variable ACL parameters among a plurality of tenants in a network;
    map parameter values for said variable ACL parameters to said tenants;

generate a multi-tenant access control list for said plurality of tenants, the multi-tenant access control list comprising said common ACL parameters and said variable ACL parameters;

store the multi-tenant access control list and said mapping; and apply the multi-tenant access control list to ports at a network device.

* * * * *